(12) United States Patent
Morishima

(10) Patent No.: US 6,490,086 B2
(45) Date of Patent: *Dec. 3, 2002

(54) IMAGE DISPLAY APPARATUS

(75) Inventor: Hideki Morishima, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,329

(22) Filed: Nov. 26, 1997

(65) Prior Publication Data

US 2002/0001127 A1 Jan. 3, 2002

(30) Foreign Application Priority Data

Dec. 9, 1996 (JP) ............................................. 8-344698

(51) Int. Cl.$^7$ ............................................. G03B 21/56
(52) U.S. Cl. ....................................... 359/443; 359/443
(58) Field of Search ................... 345/7, 8, 9; 348/115; 353/7; 359/630, 631, 632, 633, 13, 19

(56) References Cited

U.S. PATENT DOCUMENTS

| 5,034,809 | A | * | 7/1991 | Katoh ........................ 358/88 |
|---|---|---|---|---|
| 5,035,474 | A | * | 7/1991 | Moss et al. ................... 350/3.7 |
| 5,579,161 | A | * | 11/1996 | Sekiguchi .................... 359/559 |
| 5,589,956 | A | | 12/1996 | Morishima et al. ........... 359/15 |
| 5,619,419 | A | * | 4/1997 | Rallison ...................... 359/631 |
| 5,625,493 | A | | 4/1997 | Matsumura et al. ......... 359/630 |
| 5,739,797 | A | * | 4/1998 | Karasawa et al. ............. 345/8 |
| 5,835,279 | A | * | 11/1998 | Marshall et al. ............ 359/645 |
| 5,853,240 | A | * | 12/1998 | Tanaka et al. ................ 353/20 |
| 5,883,606 | A | * | 3/1999 | Smoot ............................ 345/7 |
| 5,926,321 | A | * | 7/1999 | Shikama ..................... 359/644 |

* cited by examiner

Primary Examiner—N. Le
Assistant Examiner—Etienne P LeRoux
(74) Attorney, Agent, or Firm—Fitzpatrick, Cella, Harper & Scinto

(57) ABSTRACT

An image display apparatus includes an image generator for displaying an image on a display surface constituted by a plurality of pixels, an illuminator for illuminating the image, and an optical system for guiding a light beam outgoing from the illuminated image to the pupil of the obesever. This causes the observer to observe a virtual image formed by the light beam image. In addition, a angle converter sets a first direction and a second direction substantially perpendicular thereto on the plane of formation of the virtual image and causes the light beam outgoing from each pixel to be incident on the optical system making diverging angles in the first and second directions different.

11 Claims, 7 Drawing Sheets

IMAGE DISPLAY APPARATUS

BACKGROUND OF THE INVENTION

1. Field of the Invention

The present invention relates to an image display apparatus, and more particularly to an image display apparatus for guiding the light beam containing the image information from image generating means to the eyes of the observer through the optical system thereby displaying an enlarged virtual image of the image displayed on the image generating means, and adapted for use as so-called head mounted display (hereinafter defined as HMD) to be mounted on the head of the observer.

2. Related Background Art

The head mounted display (HMD) is an apparatus for guiding the light beam, containing the image information and generated from an image displayed on the image generating means such as a liquid crystal display apparatus (LCD) or a cathode ray tube (CRT), to the pupils of the observer through the optical system thereby presenting an enlarged virtual image of the above-mentioned image, wherein the observer achieves observation by matching the exit pupil of the HMD optical system with the pupil position of the observer.

Also the HMD is preferably compact and light in weight since it is to be mounted in use on the head of the observer and, for this reason, the image generation means is often constituted by a small-sized LCD. In the HMD utilizing LCD, the light beam diverging from each of the LCD pixels shows the highest contrast in a direction which is very slightly displaced from in the normal direction to the display surface of the LCD. For this reason, the optical system of the HMD is preferably so constructed as to have the entrance pupil of the LCD side at an approximately infinite position, thereby realizing so-called telecentric system at the entrance side, and most of the proposed HMD's have the optical system of such entrance side telecentric configuration. Also in the HMD's utilizing small-sized CRT, the entrance side of the HMD is usually constructed as a telecentric system.

While the exit pupil of the optical system of the HMD is fixed, the pupils of the observer are movable by the movement of the visual axis. For this reason, the exit pupil of the optical system of the HMD is preferably made large, so as to be able to cover the movement of the pupils of the observer.

FIG. 2 is a schematic view showing the range of movement of the pupil of the observer, resulting from the movement of the visual axis, wherein a schematically represented eyeball 100 of the observer rotates about a center 101 of rotation when the visual axis moves. $I_C$ indicates the pupil of the observer, with a pupil diameter p, when the visual axis of the observer is directed straight ahead. The pupil $I_C$ is positioned at a distance r from the center of rotation of the eyeball. For an entire angular width w of the displayed image, the pupil of the observer moves to a position $I_R$ when the visual axis is shifted to the right-hand end, or a position $I_L$ when the visual axis is shifted to the left-hand end.

Consequently, with the movement of the visual axis within the field of view w, the pupil of the observer moves within a range represented by a line segment AB, of which length s is given by the following equation (1):

$$s=2 \cdot \{r \cdot \sin(w/2) + (p/2) \cdot \cos(w/2)\} \qquad (1)$$

The diameter of the exit pupil of the HMD optical system is preferably at least equal to the length s given by the equation (1). Consequently, the length s is called the desirable exit pupil diameter. In the equations of the present text, a mark · indicates multiplication.

In general, the field of view $W_H$ of the HMD in the horizontal direction is selected larger than that $W_V$ in the vertical direction. On the other hand, the light illuminating the LCD is generally symmetrical about the axis perpendicular to the light-emitting face of the light source and, if certain means is provided, for example for increasing the numerical aperture of the illuminating light beam, in order to obtain an exit pupil diameter sufficiently large for the image display angle in the horizontal direction, the exit pupil diameter may become excessively large for the vertical direction to deteriorate the efficiency of utilization of the LCD illuminating light.

On the other hand, because of the characteristics inherent to the LCD, within the light beam outgoing from each of the liquid crystal pixels, the light beam showing a high contrast and suitable for image display is limited to a certain diverging angle ($\alpha$/2) with respect to the normal line to the display surface of the LCD. The entire width a will be called an effective viewfield angle of the LCD.

FIG. 7 is a view showing the relationship, in the optical system of HMD, among the effective viewfield angle $\alpha$, the size h of the LCD display area, the field of view w of the HMD and the exit pupil diameter q of the optical system, wherein shown are a schematically illustrated optical system 2 of the HMD, an LCD 3 and an exit pupil 3 of the HMD optical system. The light beam entering from the LCD 3 into the HMD optical system 2 is assumed to be telecentric (a ray outgoing from the display surface of the LCD 3 perpendicularly thereto being the principal ray). In this state there stands the following relation (2) wherein f is the focal length of the HMD optical system 2 and h is the width of LCD:

$$f=h/\{2 \cdot \tan(w/2)\} \qquad (2)$$

As the virtual image displayed by the HMD optical system 2 is generally distanced from the pupil by as large as 1 to 2 meters, the light beams from the different points on the display surface of the LCD reach the exit pupil of the optical system in substantially parallel light beams. As shown in FIG. 7, a pair of peripheral rays $R_1$, $R_2$ outgoing from a point C on the LCD 3 within the diverging angle a in the plane of drawing become parallel light beams after passing the optical system 2 and pass the exit pupil plane in this state. The distance between a pair of peripheral rays $R_1$, $R_2$ at the position of the exit pupil represents the exit pupil diameter q in the direction of the plane of drawing paper.

Consequently the following relation (3) stands among the effective viewfield angle $\alpha$ of the LCD, the entire focal length f of the HMD optical system 2 and the exit pupil diameter of the optical system:

$$q=2 \cdot f \cdot \tan(\alpha/2) \qquad (3)$$

The relations (2) and (3) lead to the following relation among the exit pupil q, the field of view w of the HMD and the size h of the LCD display surface:

$$q=h \cdot \tan(\alpha/2)/\tan(w/2) \qquad (4)$$

The value q represented by the equation (4) indicates the maximum exit pupil diameter formed by the light beam of high image contrast within the effective viewfield angle $\alpha$ of the LCD and will be called the exit pupil diameter of the optical system.

By substituting, for the distance r from the center of the eye to the pupil and the pupil diameter p, r=13 mm and p=2 mm as the average values for human being in the equation (1) and also substituting α=30° as the effective viewfield angle of ordinary small-sized LCD's in the equation (4), there are obtained:

$$\text{desirable exit pupil diameter } s=2\cdot\{13\cdot\sin(w/2)+\cos(w/2)\} \quad (1)'$$

$$\text{optical system exit pupil diameter } q=h\cdot\tan(15°)/\tan(w/2) \quad (4)'$$

and the comparison of the equations (1)' and (4)' indicates that the desirable exit pupil diameter of the HMD optical system increases with the increase of the entire angular display width w while the exit pupil diameter q of the optical system, formed by the light beam within the effective viewfield angle α of the LCD decreases with the increase of the field of view w.

Consequently, for a given size h of the LCD display surface, the field of view w becomes limited if the display is made with the light beam of high image contrast within the effective viewfield angle α of the LCD.

Also according to the equation (4)', the exit pupil diameter q of the optical system is proportional to the size h of the LCD display surface. In case of HMD, the size of the LCD cannot be made very large for mounting on the head of the observer, so that the field of view w of the HMD cannot be made large.

On the other hand, a larger field of view w is a preferred factor in the virtual reality which is a representative application of the HMD, so that the limitation in the field of view w is a significant drawback.

Furthermore, as having, already explained in the foregoing, the field of view $W_H$ of the HMD in the horizontal direction is generally selected larger than that $W_V$ in the vertical direction, while the effective viewfield angle α of the LCD is generally symmetrical about the normal line to each point on the display surface of the LCD and, if certain means is provided, for example for increasing the effective viewfield angle of the LCD, in order to obtain an exit pupil diameter $q_H$ sufficiently large for the field of view $W_H$ in the horizontal direction, the exit pupil diameter $q_H$ for the vertical direction may become excessively large whereby the efficiency of utilization of the LCD illuminating light becomes deteriorated.

SUMMARY OF THE INVENTION

The object of the present invention is to provide an image display apparatus adapted for use in a head mounted display characterized in that in illuminating image generation means with an illuminating light beam from an illuminating panel light source and guiding the light beam, from the image displayed on the image generation means, to the pupils of the observer thereby causing the observer to observe a virtual image of the above-mentioned image, to convert the light beam of high intensity from the illuminating panel light source or the light beam of high contrast suitable for image display, from the image generation means, into the light beam having different diverging angles in the horizontal and vertical directions, and to realize, with such light beam, an exit pupil diameter of the optical system satisfying the desirable exit pupil diameter corresponding to the horizontal and vertical image display angles of the image display apparatus, thereby providing a bright or high-contrast image without eclipse of the pupil at the peripheral image angle even when the observer shifts the visual axis.

The above-mentioned object can be attained, according to an aspect of the present invention, by an image display apparatus comprising:

image generation means for displaying an image on a display surface constituted by a plurality of pixels;

illumination means for illuminating the image;

an optical system for guiding the light beam outgoing from the illuminated image to the pupils of the observer thereby causing the observer to observe a virtual image of the above-mentioned image formed by the light beam; and diverging angle conversion means for setting a first direction and a second direction substantially perpendicular to the first direction in the forming plane of the virtual image, and causing the light beam outgoing from each pixel to enter the optical system with different diverging angles in the first and second directions.

The light beam having the different diverging angles in the first and second directions and entering the optical system forms, after outgoing therefrom, an exit pupil having different diameters in the first and second directions.

The diverging angle conversion means is positioned between the illumination means and the image generating means, and the light beam outgoing perpendicularly to the light-emitting surface of the illumination means and directed toward one of the pixels illuminates the image with a predetermined diverging angle formed by the diverging angle conversion means and then enters the optical system in the form of a light beam of a substantially same diverging angle.

In the light beam outgoing perpendicularly from the light-emitting surface of the illumination means and directed toward one of the pixels, two pairs of peripheral rays in the first and second directions are converted by the diverging angle conversion means into a pair of peripheral rays having different diverging angles in the first and second directions to illuminate the image and, after passing the optical system, at the exit pupil position thereof, a pair of peripheral rays in the first direction are mutually separated by a distance $q_H$ represented by:

$$2.4\cdot\{13\cdot\sin(W_H/2)+\cos(W_H/2)\}\geq q_H\geq 2\cdot\{13\cdot\sin(W_H/2)\}$$

while a pair of peripheral rays in the second direction are mutually separated by a distance $q_v$ represented by:

$$2.4\cdot\{13\cdot\sin(W_V/2)+\cos(W_V/2)\}\geq q_V\geq 2\cdot\{13\cdot\sin(W_V/2)\}$$

wherein $W_H$ stands for the field of view of the virtual image in the first direction, and $W_V$ stands for the field of view of the virtual image in the second direction.

The diverging angle conversion means is positioned between the image generation means and the optical system, and the light beam suitable for image display, outgoing from the pixel is subjected to the conversion of the diverging angle by the diverging angle conversion means and then enters the optical system.

In the light beam suitable image display, outgoing from the pixel, two pairs of peripheral rays in the first and second directions are converted by the diverging angle conversion means into a pair of peripheral rays having different diverging angles in the first and second directions to illuminate the image and, after passing the optical system, at the exit pupil position thereof, a pair of peripheral rays in the first direction are mutually separated by a distance $q_H$ represented by:

$$2.4\cdot\{13\cdot\sin(W_H/2)+\cos(W_H/2)\}\geq q_H\geq 2\cdot\{13\cdot\sin(W_H/2)\}$$

while a pair of peripheral rays in the second direction are mutually separated by a distance $q_V$ represented by:

$$2.4\cdot\{13\cdot\sin(W_V/2)+\cos(W_V/2)\}\geq q_V\geq 2\cdot\{13\cdot\sin(W_V/2)\}$$

wherein $W_H$ stands for field of view of the virtual image in the first direction, and $W_V$ stands for the field of view of the virtual image in the second direction.

The diverging angle conversion means includes an anamorphic microlens having different focal lengths in the first and second directions.

The diverging angle conversion means includes plural cylindrical microlenses having different focal lengths in the first and second directions.

The present invention will be clarified in detail by embodiments thereof to be explained in the following.

DETAILED DESCRIPTION OF THE PREFERRED EMBODIMENTS

Figure 1:
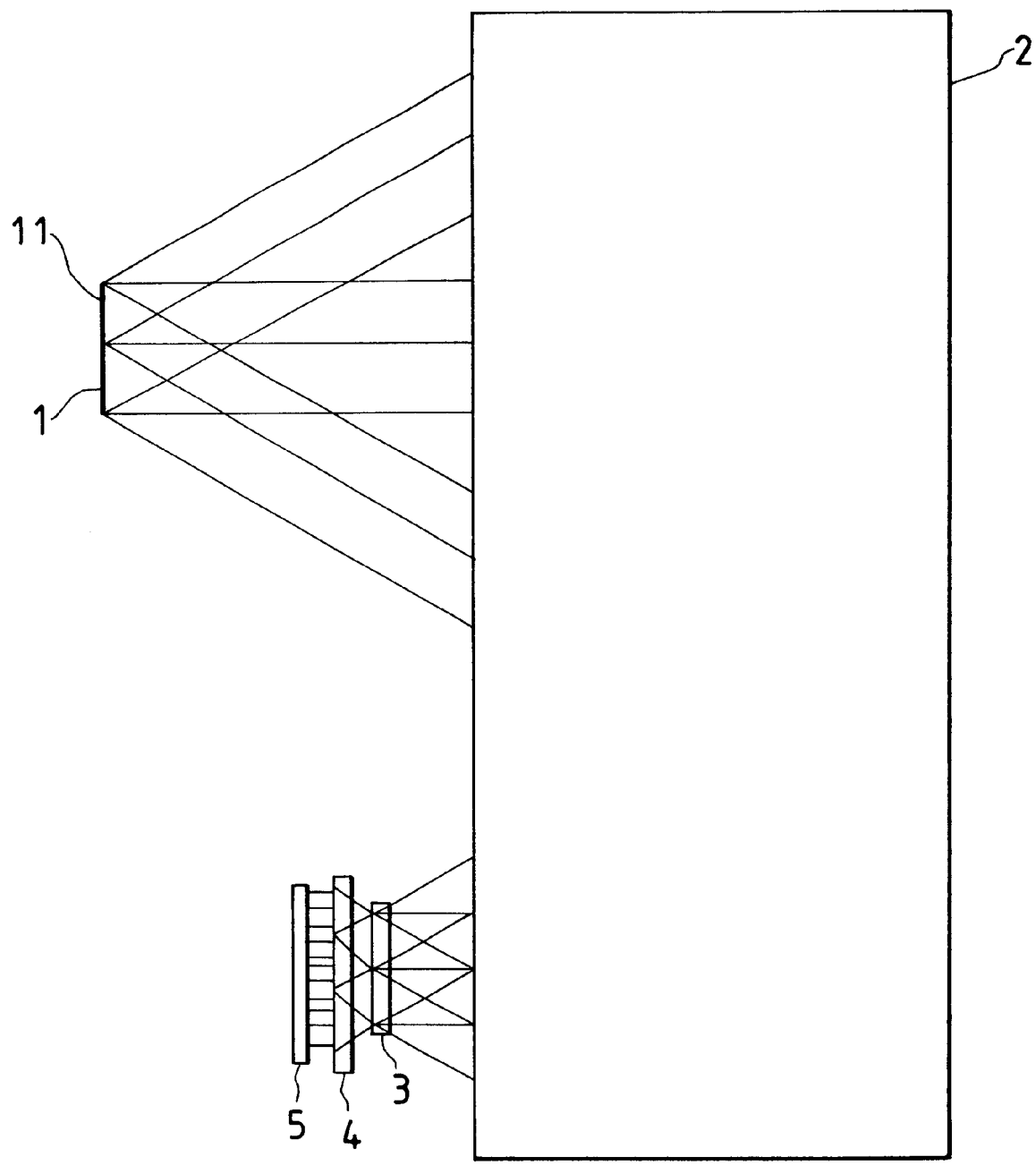
FIG. 1 is a schematic view of an embodiment 1 of the present invention.

FIG. 1 is a schematic cross-sectional view, in the horizontal direction, of an embodiment 1 of the present invention. The optical system of the present embodiment is symmetrical with respect to the vertical symmetrical plane of the face of the observer, and FIG. 1 only shows a part of the optical system, corresponding to the right eye of the observer.

The present embodiment is an image display apparatus employing, as the image generation means, a liquid crystal display (LCD) with a display surface of a diagonal length of 0.7 inch (14.22 mm in horizontal length and 10.66 mm in vertical length) and an aspect ratio of 4:3, with a horizontal field of view $W_H=60°$ (entire width) and a vertical field of view $W_V=46.8°$ (entire width).

In FIG. 1 there are shown a right eye 1 of the observer, an optical system 2 utilizing an eccentric mirror and constituting the HMD, image generation means 3 constituted by the liquid crystal display (LCD) apparatus of which display surface is constituted by a two-dimensional array of discrete pixels, a microlens array 4 containing plural diverging angle conversion means (anamorphic microlenses), an illuminating panel light source 5, and an exit pupil 11 of the optical system 2.

Figure 2:
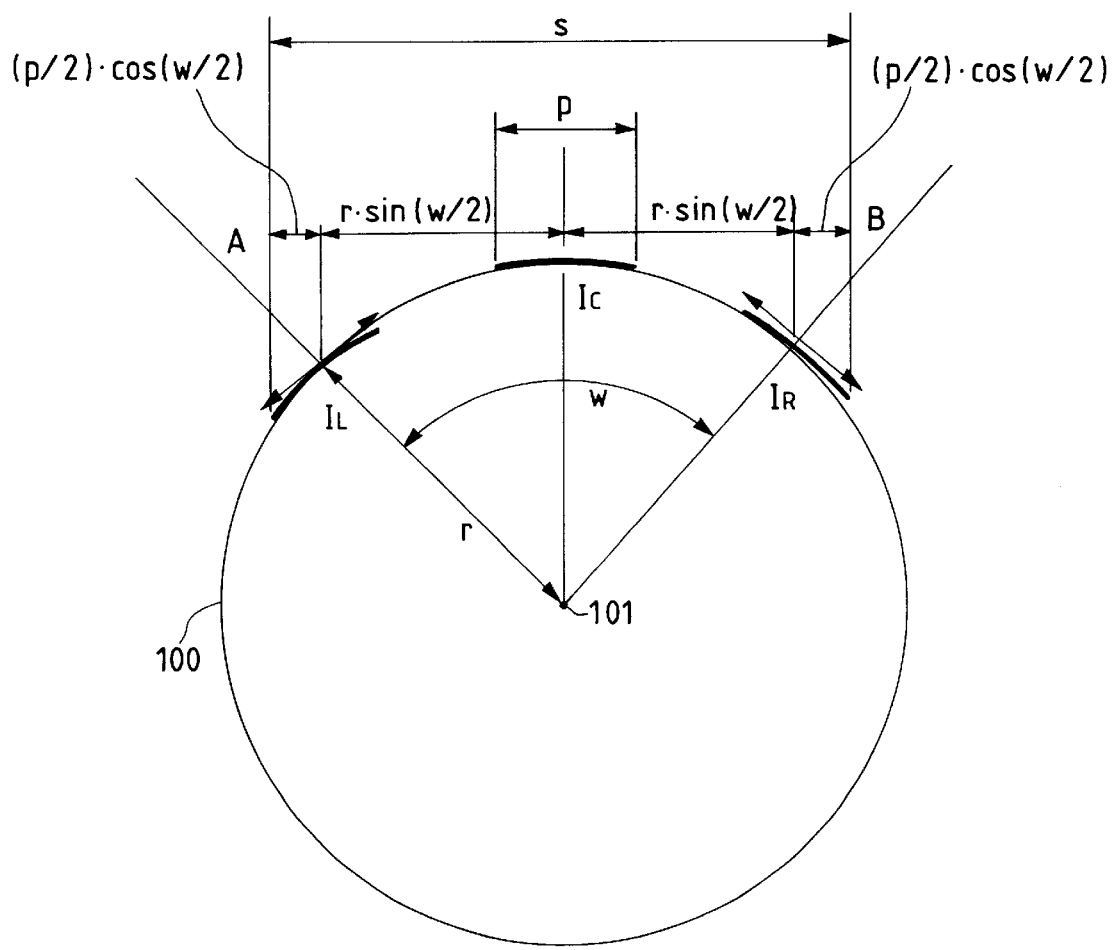
FIG. 2 is a schematic view showing the range of movement of the pupil of the observer by the movement of the visual axis.

FIG. 2 is a view showing the range of movement of the pupil of the observer by the movement of the visual axis. A schematically represented eyeball 100 of the observer rotates about a center 101 of the rotation by the movement of the visual axis. $I_C$ indicates the pupil of the observer with a pupil diameter p, when the visual axis of the observer is directed straight ahead. The pupil $I_C$ is positioned at a distance r from the center of rotation of the eye. The average values of the distance r from the center of the eye to the pupil and the pupil diameter p are respectively r=13 mm and p=2 mm. For an entire angular display width w, the pupil of the observer moves to a position $I_R$ or $I_L$ respectively when the visual axis is shifted to the right-hand end or to the left-hand end in FIG. 2.

Consequently, when the visual axis moves within the angular display width w, the pupil of the observer moves within a range represented by a line segment AB, of which length s is given by the following equation (1):

$$s=2\cdot\{r\cdot\sin(w/2)+(p/2)\cdot\cos(w/2)\} \quad (1)$$

The diameter of the exit pupil of the HMD optical system is preferably at least equal to the length s given by the equation (1). The length s is therefore called the desirable exit pupil diameter, as explained before. In the present embodiment, by substituting the horizontal field of view $W_H$, the vertical field of view $W_V$, the average values r=13 mm and p=2 mm as the average values in human being for the distance r from the center of the eye to the pupil and the pupil diameter p, in the equation (1), there are obtained, from the following equations:

$$s_H=2\cdot\{13\cdot\sin(W_H/2)+\cos(W_H/2)\} \quad (1_H)'$$

$$s_V=2\cdot\{13\cdot\sin(W_V/2)+\cos(W_V/2)\} \quad (1_V)'$$

the desirable exit pupil diameter $S_H=14.73$ mm in the horizontal direction of the HMD and the desirable exit pupil diameter $s_V=12.17$ mm in the vertical direction. For given values of r and p in the equation (1), the desirable exit pupil diameter s of the HMD optical system increases with the increase of the field of view w.

Figure 3:
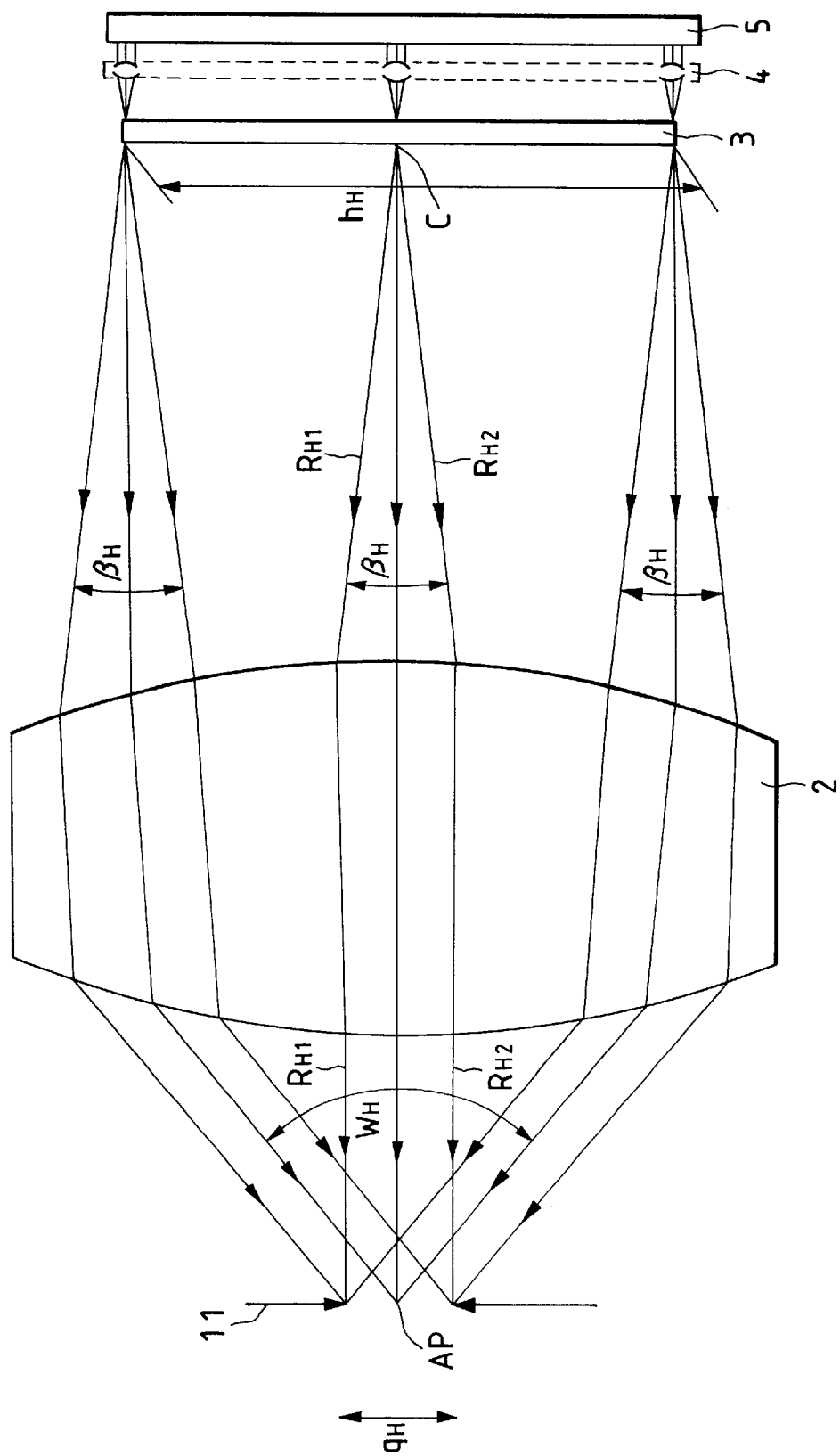
FIG. 3 is a view showing the relationship among the diverging angle of the light beam from the LCD, size of the LCD display surface, entire angular display width of the HMD, and exit pupil diameter of the optical system in the embodiment 1.

Then there is determined the exit pupil diameter of the optical system 2. FIG. 3 shows the relationship in the embodiment 1 among the light beams outgoing from the LCD 3 with a diverging angle $\beta_H$ in the horizontal direction, the horizontal size $h_H$ of the display surface of the LCD 3, the field of view $W_H$ of the HMD in the horizontal direction, and the exit pupil $q_H$ of the optical system in the horizontal direction. In FIG. 3, there are shown the schematically represented optical system 2 of the HMD, and the exit pupil 3 of the optical system 2. The light beams entering the optical system 2 of the HMD from the LCD 3 are telecentric. Consequently, in the present embodiment, the center of the exit pupil 11 is the crossing point AP of the principal rays, perpendicularly outgoing from the different points on the LCD 3, after transmitted by the optical system 2. Thus, for the focal length f of the optical system 2, there stands the following equation ($2_H$):

$$f=h_H/\{2\cdot\tan(W_H/2)\} \quad (2_H)$$

According to the equation ($2_H$), the optical system constituting the HMD has a focal length f=12.32 mm.

Since the virtual image displayed by the optical system 2 is generally distanced by 1 to 2 meters from the pupil of the observer, the light beams outgoing from the display surface of the LCD 3 with the diverging angle $\beta_H$ reach the exit pupil 11 of the optical system as substantially parallel light beams. In the plane of FIG. 3, a pair of peripheral rays $R_{H1}$ $R_{H2}$ of the light beam outgoing with a diverging angle $\beta_H$ from a point C on the LCD 3 become mutually parallel after passing the optical system 2 and pass the plane of the exit pupil in this state. The distance of the peripheral rays $R_{H1}$, $R_{H2}$ at the position of the exit pupil defines the exit pupil diameter $q_H$ in the horizontal direction. Consequently, the following relation ($3_H$) stands among the diverging angle $\beta_H$ of the light beam at the display surface of the LCD 3, the focal length f of the optical system 2 and the exit pupil diameter $q_H$ thereof in the horizontal direction:

$$q_H = 2 \cdot f \cdot \tan(\beta_H/2) \quad (3_H)$$

By substituting the equation ($2_H$) in ($3_H$), there is obtained:

$$q_H = h_H \cdot \tan(\beta_H/2)/\tan(W_H/2) \quad (4_H)$$

The value $q_H$ in the equation ($4_H$) indicates the exit pupil diameter in the horizontal direction, defined by the light beam, having the diverging angle $\beta_H$ in the horizontal direction at the display surface of the LCD 3, and it is called the horizontal exit pupil diameter of the optical system. For a fixed value of $h_H$, this equation indicates that the horizontal exit pupil diameter $q_H$ of the optical system, defined by the light beam outgoing from the LCD with the diverging angle $\beta_H$, decreases with the increase of the field of view $W_H$. The foregoing explanation is limited to the horizontal direction, but a similar situation can be derived also for the vertical direction.

In the above-explained configuration, if the diverging angle of the light beam is the same in the horizontal and vertical directions, the exit pupil diameter $q_V$ in the horizontal direction becomes equal to that $q_V$ in the vertical direction. More specifically, in the present embodiment, $q_H = q_V = 6.7$ mm if $\beta_H = \beta_V = 30°$.

This value is considerably smaller than the desirable exit pupil diameter $s_H = 14.73$ mm in the horizontal direction and that $s_V = 12.17$ mm in the vertical direction mentioned above. In order to realize these desirable values of the exit pupil diameter, the light beams at different points of the LCD 3 have to have a diverging angle $\beta_H = 61.74°$ (entire width) in the horizontal direction and a diverging angle $\beta_V = 52.56°$ (entire width) in the vertical direction.

In general, the image display angle of the HMD in the horizontal direction is selected larger than that in the vertical direction. On the other hand, the illuminating light for the LCD, coming from the illuminating panel light source 5 is generally symmetrical about the normal line to the light-emitting face. Thus, if there is employed an illuminating light beam with a diverging angle of $\beta/2 = 15°$ or $\beta = 30°$ and if certain means is provided, for example for increasing the numerical aperture of the illuminating light beam, in order to obtain an exit pupil diameter sufficiently large for the image display angle in the horizontal direction, the exit pupil diameter may become excessively large for the vertical direction whereby the efficiency of utilization of the LCD illuminating light becomes deteriorated.

In the present embodiment, the parallel light beam of a high intensity from the illuminating panel light source 5 is converted, by the diverging angle conversion means provided for each pixel, into a light beam showing different diverging angles in the horizontal and vertical directions to illuminate the pixel of the LCD 3, thereby forming an exit pupil satisfying the desirable value of the exit pupil. In the present embodiment, anamorphic microlenses are employed for such diverging angle conversion means.

Figure 4A:
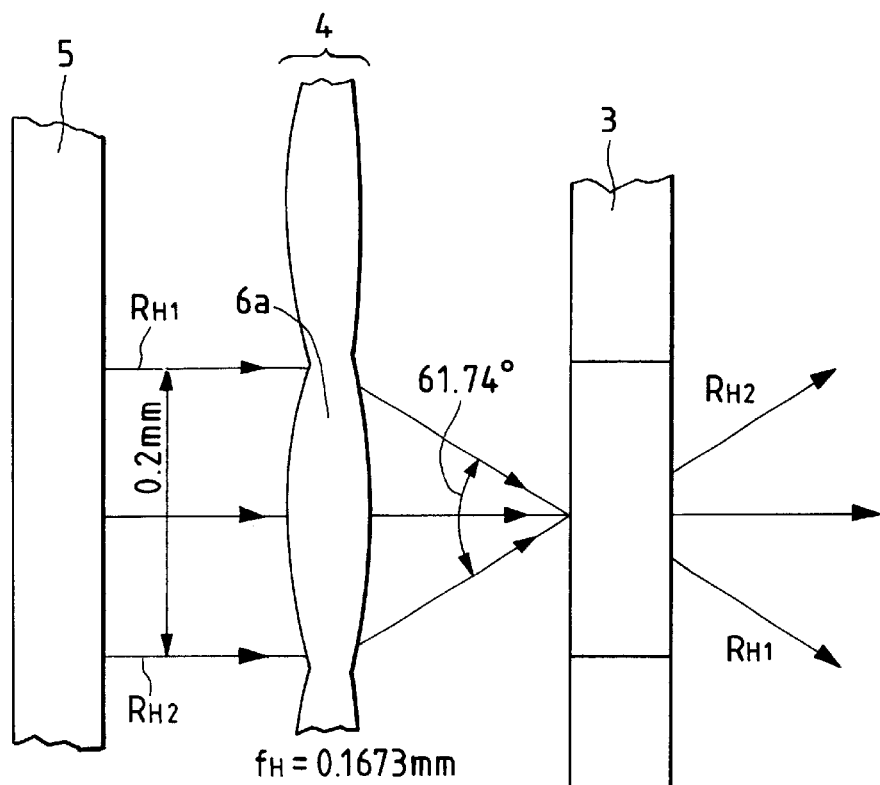
FIGS. 4A and 4B are schematic views showing an anamorphic microlens constituting the microlens array of the embodiment 1.
Figure 4B:
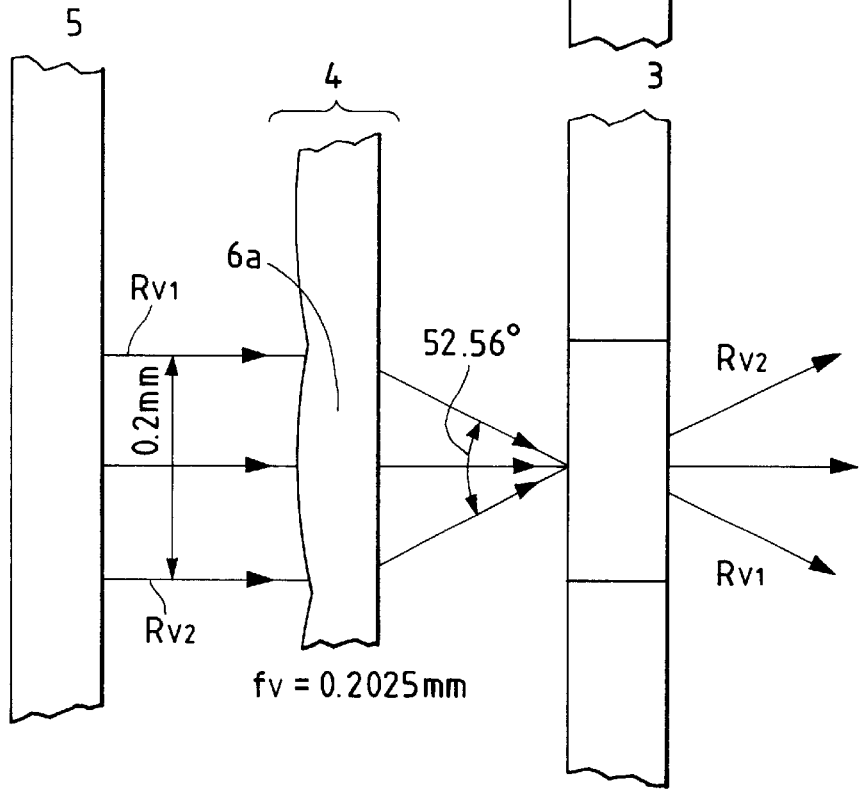

FIGS. 4A and 4B are magnified cross-sectional views, respectively in the horizontal and vertical directions, of an anamorphic microlens constituting the microlens array of the embodiment 1, wherein 6a illustrates one of the anamorphic microlenses (diverging angle conversion means) constituting the microlens array 4. Such anamorphic microlenses are provided respectively corresponding to the plural pixels constituting the display surface of the LCD 3.

The illuminating light from the illuminating panel light source 5 in general has the highest intensity in a direction perpendicular to the panel surface, and has the substantially symmetrical angular characteristics. For this reason, in the present embodiment, the microlens array 4 constituted by the anamorphic microlenses 6, having different focal lengths in the horizontal and vertical cross sections is inserted between the illuminating panel light source 5 and the LCD 3, in order to obtain a sufficiently large and flat-shaped exit pupil.

Referring to FIG. 4A, the distance between the illuminating panel light source 5 and the anamorphic microlens 6a is 0.05 mm and the diameter of the light beam illuminating each anamorphic microlens 6a is about 0.2 mm. $R_{H1}$ and $R_{H2}$ indicate a pair of peripheral rays in the horizontal direction. The microlens is so designed to have a focal length $f_H = 0.1/\tan(61.74°/2) = 0.1673$ mm in the plane of FIG. 4A (horizontal direction).

Referring to FIG. 4B, the distance between the illuminating panel light source 5 and the anamorphic microlens 6a and that between the anamorphic microlens 6a and liquid crystal plane of the LCD 3 are the same as those in FIG. 4A, but the microlens is so designed to have a focal length $f_V = 0.1/\tan(52.56°/2) = 0.2025$ mm in the plane of FIG. 4B (vertical direction). $R_{V1}$ and $R_{V2}$ indicate a pair of peripheral rays in the vertical direction.

The illuminating light in the state of parallel light beams (diverging angle 0°) of high intensity, directed from the illuminating panel light source 5 to the pixels in the liquid crystal display surface, is converted by the microlens array constituted by the above-explained anamorphic microlenses 6a into light beams with a horizontal diverging angle of 61.74° (entire width) and a vertical diverging angle of 52.56° (entire width) for illuminating the LCD 3, then emerges therefrom as the light beams of substantially the same diverging angles and, after passing the optical system 2, forms an exit pupil 11 thereof with a size of $q_H = 14.73$ mm in the horizontal direction and $q_V = 12.17$ mm in the vertical direction.

In the present embodiment, the microlens array 4 is positioned between the illuminating panel light source 5 and the LCD 3, and the illuminating light of high intensity outgoing from the illuminating panel light source 5 is converted by the anamorphic microlenses 6a constituting the microlens array into light beams having different diverging angles in the horizontal and vertical directions for illuminating the pixels of the LCD 3, and the light beams outgoing from such pixels with substantially the same diverging angles form, after passing the optical system 2, exit pupils $q_H$, $q_V$ of the optical system, matching the desirable values $s_H$, $s_V$ of the exit pupil in the horizontal and vertical directions. Thus there can be provided an image display apparatus ensuring high brightness and easy observation, as the exit pupil of a necessary and sufficient size with the illuminating light beam of high intensity, taking the characteristics of the light source into consideration.

Figure 5:
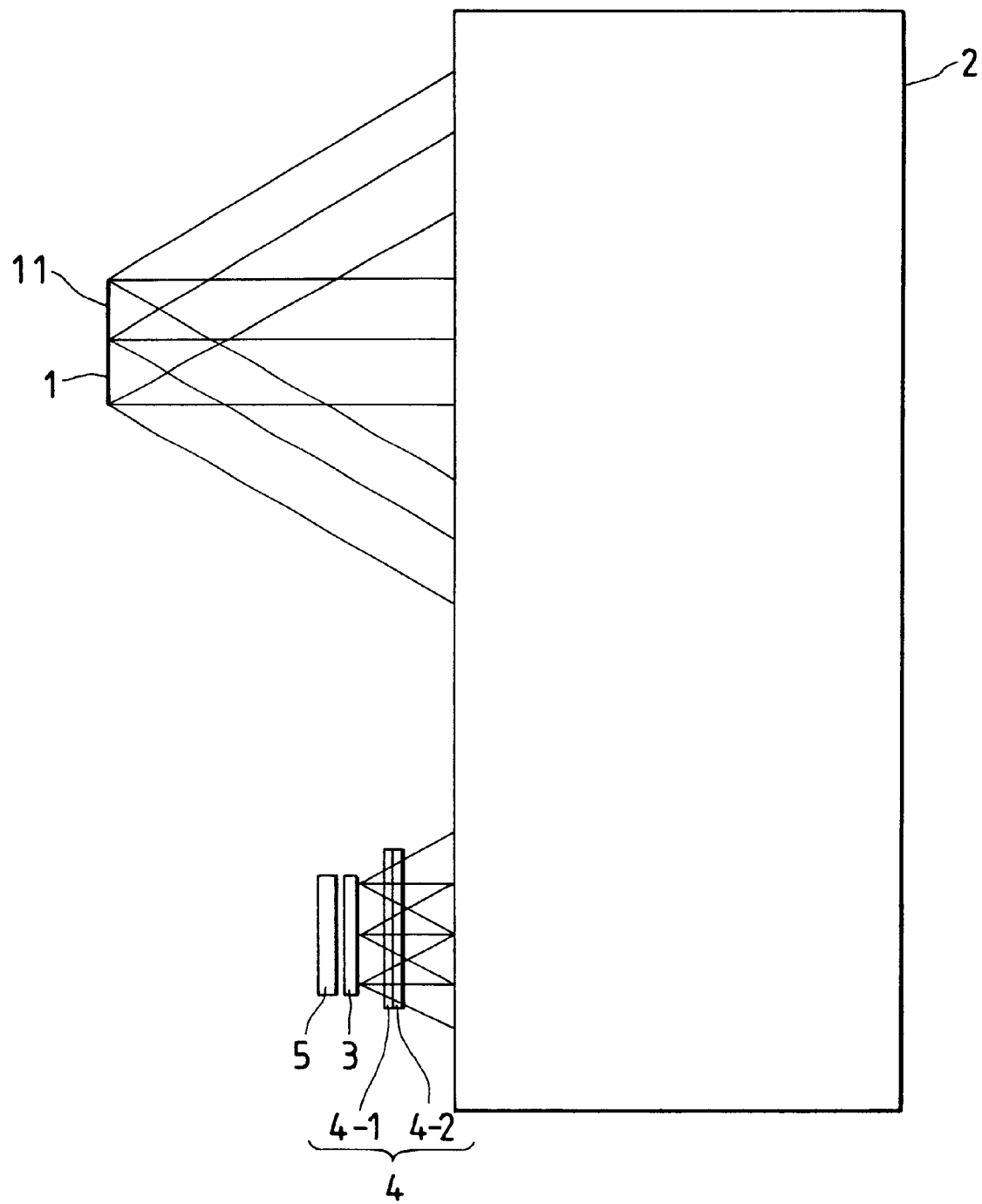
FIG. 5 is a schematic view of an embodiment 2 of the present invention.

FIG. 5 is a schematic horizontal cross-sectional view of an embodiment 2 of the present invention. The optical system of the present embodiment is symmetrical with respect to the vertical symmetrical plane of the face of the observer, and FIG. 5 only shows a part of the optical system, corresponding to the right eye of the observer. Also components the same as those in FIGS. 1, 4A and 4B are represented by, same numbers.

The present embodiment employs, as in the embodiment 1, a liquid crystal display (LCD) with a display surface of a diagonal length of 0.7 inch (14.22 mm in horizontal length and 10.66 mm in vertical length) and an aspect ratio of 4:3 as the image generation means, with a horizontal field of view $W_H$=60° (entire width) and a vertical field of view $W_V$46.8° (entire width).

In FIG. 5, there are shown a right eye 1 of the observer, an eccentric mirror optical system 2 constituting the HMD, a liquid crystal display (LCD) apparatus 3, a first lens array 4-1 and a second lens array 4-2 which in combination constitute a microlens array 4 and each of which is provided with plural diverging angle conversion means (cylindrical microlenses), and an illuminating panel light source 5.

According to the foregoing equation (2), the optical system constituting the HMD has a focal length f=12.32 mm and, also according to the foregoing equation (1), the desirable exit pupil diameter of the HMD is $s_H$=14.73 mm for the horizontal direction and $s_V$=12.17 mm for the vertical direction.

Because of the property of the liquid crystal, among the rays light emitted from each pixel of the LCD, the ray capable of transmitting the image contrast as high as about 1:10 (light beam constituted by such rays being hereinafter defined "light beam suitable for image display" as mentioned in the foregoing) is limited within a certain angle $\alpha/2$ with respect to the normal line to the display surface of the liquid crystal. Such angle $\alpha$ (entire width) shall be called "effective viewfield angle of LCD" as already explained in the foregoing. The effective viewfield angle $\alpha$ is usually about 30°.

As already explained in the foregoing, the light beam of the effective viewing angle $\alpha$ forms an exit pupil diameter q represented by the following equation (4):

$$q = h \cdot \tan(\alpha/2) / \tan(w/2) \quad (4)$$

By substituting $h_H$=14.22 mm, $\alpha$=30° and $W_H$=60°, there is obtained an exit pupil diameter $q_H$=6.7 mm in the horizontal direction. This value is significantly smaller than the desirable exit pupil diameter $s_H$=14.73 mm in the horizontal direction, so that the pupil of the observer is positioned out of the exit pupil of the optical system even by a slight rotation of the eye, whereby the image becomes eclipsed.

In order to achieve the desirable values of the exit pupil with the light beam of high contrast, the LCD is required to have effective viewfield angles of $\alpha_H$=61.74° (entire width) in the horizontal direction and $\alpha_V$=52.56° (entire width) in the vertical direction, but such effective viewfield angles are not achievable with the present LCD.

Also for a fixed size h of the display surface of the LCD, the equations (1) and (4) indicate that the entire angular display width w becomes limited if the display is to be made with the light beam of high image contrast within the effective viewfield angle $\alpha$ of the LCD.

Also according to the equation (4), the exit pupil diameter q of the optical system is proportional to the size h of the LCD display surface, but, in case of HMD, a large LCD cannot be employed because of the necessity of mounting on the head, so that the image display angle of the HMD cannot be made large.

In the present embodiment, the light beam of the effective viewfield angle $\alpha$=30° (entire width) from each pixel of the LCD 3 is converted, by the diverging angle conversion means provided for each pixel, into a light beam having different diverging angles in the horizontal and vertical directions, thereby forming an exit pupil satisfying the desirable values of the exit pupil diameter. The present embodiment employs plural cylindrical microlenses for such diverging angle conversion means.

Figure 6A:
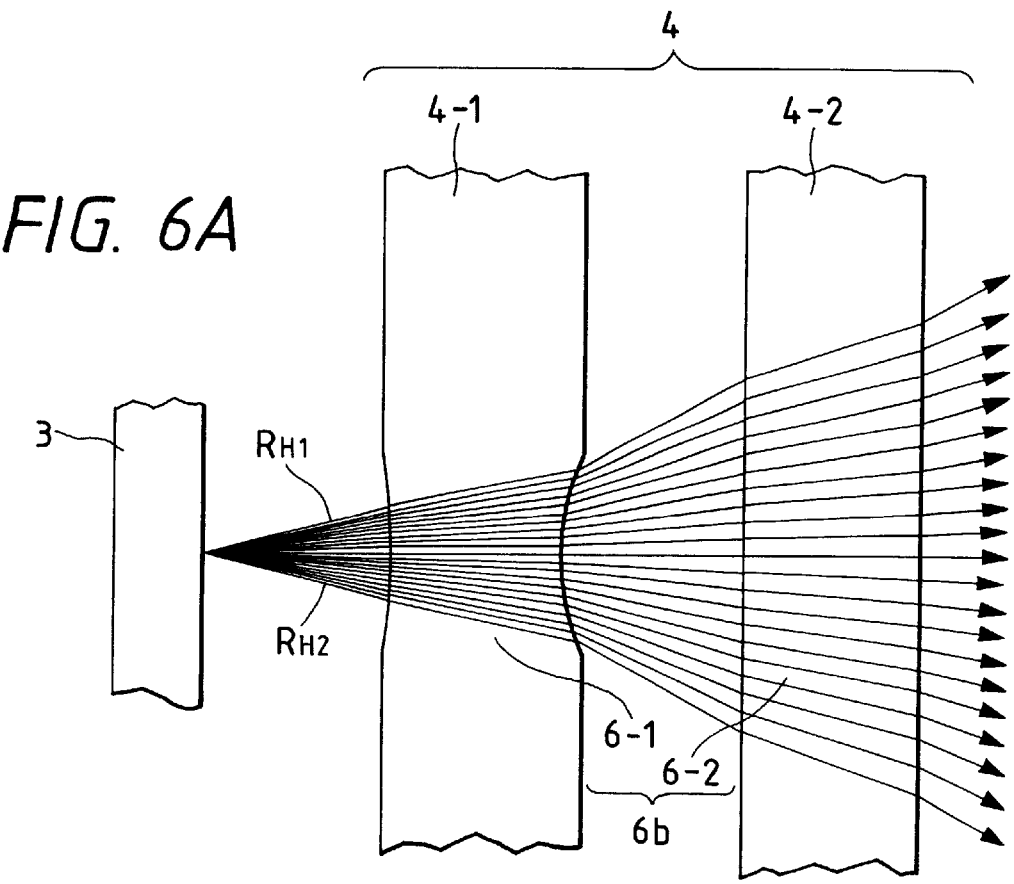
FIGS. 6A and 6B are schematic views showing a cylindrical microlens constituting the microlens array of the embodiment 2.
Figure 6B:
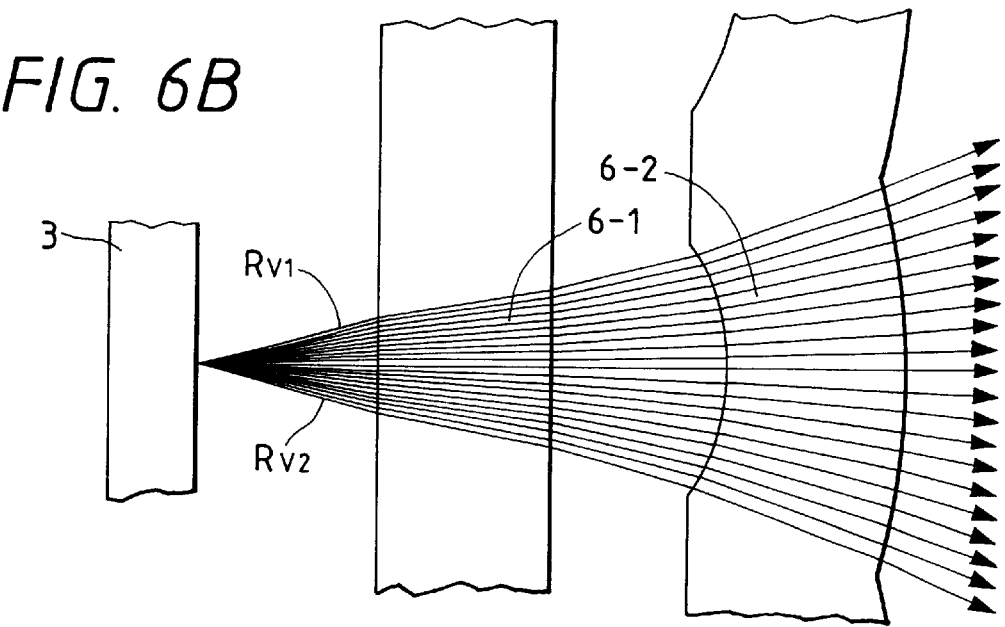
Figure 7:
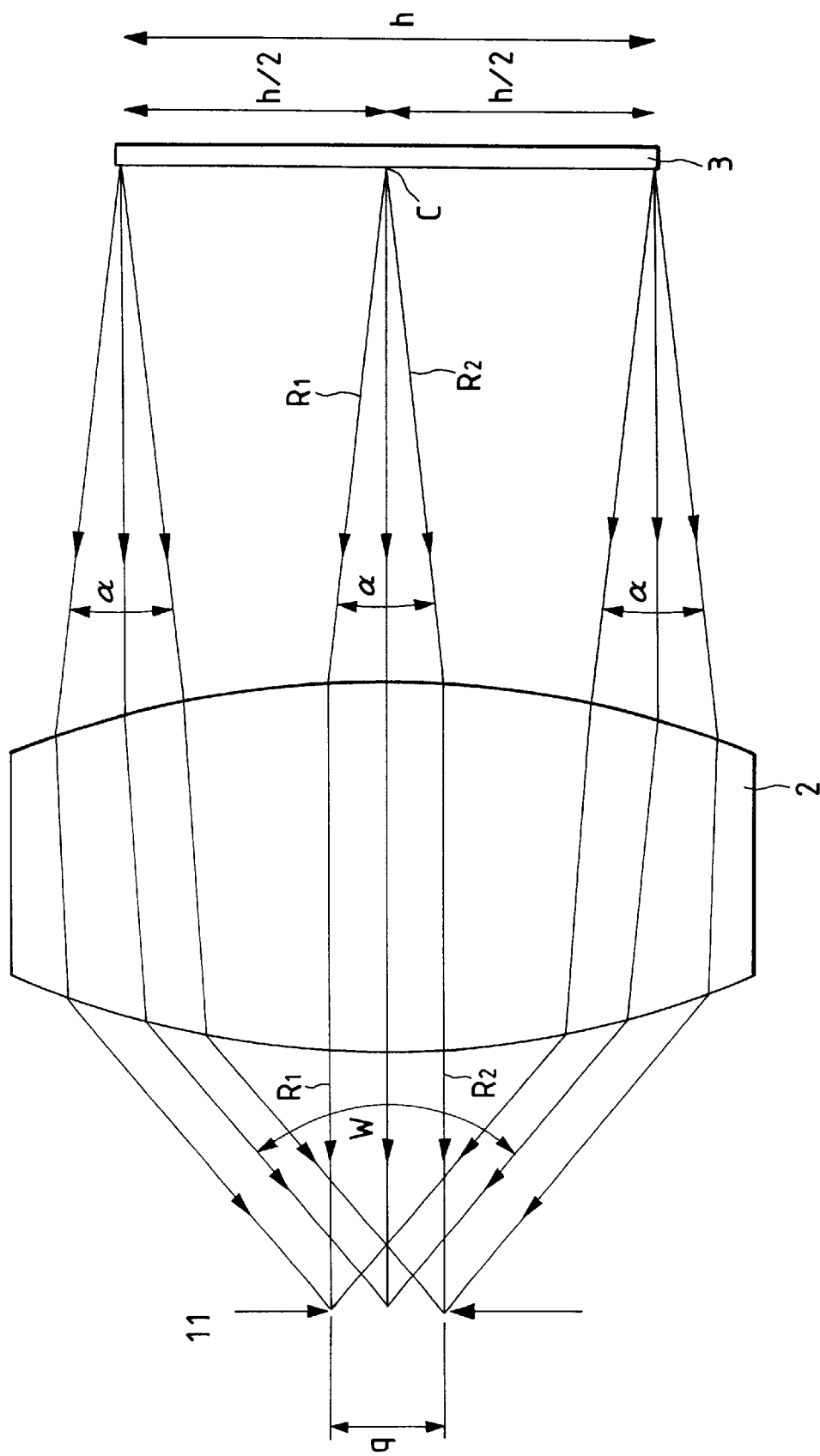
FIG. 7 is a view showing the relationship among the effective viewfield angle of the HMD, size of the LCD display surface, entire angular display width of the HMD, and exit pupil diameter of the optical system in the optical system of the HMD.

FIGS. 6A and 6B are magnified cross-sectional views, respectively in the horizontal and vertical directions, of a cylindrical microlens constituting the microlens array of the embodiment 2, wherein mutually common components are represented by same numbers.

Referring to FIG. 6A, there are shown first and second cylindrical microlenses 6-1, 6-2, constituting a microlens 6b. The first cylindrical microlens 6-1 has a refractive power only in the horizontal cross-sectional direction and constitutes a component of a first lens array 4-1. $R_{H1}$ and $R_{H2}$ indicate a pair of peripheral rays of a light beam with an effective viewfield angle of 30° in the horizontal direction, outgoing from a pixel of the LCD 3.

The second cylindrical microlens 6-2 has a refractive power only in the vertical cross-sectional direction and constitutes a component of a second lens array 4-2. $R_{V1}$ and $R_{V2}$ indicate a pair of peripheral rays of a light beam with an effective viewfield angle of 30° in the vertical direction, outgoing from a pixel of the LCD 3.

The microlens 6-2 has a focal length $f_H$=−0.2 mm in the horizontal direction and $f_V$=−0.36 mm in the vertical direction. The distance between the peripheral point of the microlens and the display plane of the LCD 3 is 0.246 mm in the horizontal cross section and 0.304 mm in the vertical cross section.

The light beam of high image contrast within the effective viewfield angle of 30°, from each pixel of the LCD 3, is converted by the two cylindrical microlenses 4-1, 4-2 into a light beam having diverging angles of 61.74° (entire width) in the horizontal direction and 52.56° (entire width) in the vertical direction, which, after passing the HMD optical system 2, forms an exit pupil and reaches the pupil of the observer. The exit pupil thus formed has a diameter of 14.73 mm in the horizontal direction and 12.17 mm in the vertical direction, thus sufficiently satisfying the desirable values of the exit pupil diameter.

In the present embodiment, the microlens array 4 comprising each pixel with the microlens 6b consisting of the first and second cylindrical microlenses (diverging angle conversion means) is positioned immediately after the LCD 3 in the space between the LCD 3 and the optical system 2, and the illuminating light of the effective viewfield angle $\alpha$ from the LCD 3 is thus converted into a light beam having different diverging angles in the horizontal and vertical directions to be incident on the optical system 2, which, after passing the optical system 2, forms an exit pupil of the optical system matching the desirable values of the exit pupil in the horizontal and vertical directions. Thus there can be provided an image display apparatus ensuring high contrast and easy observation, as the exit pupil of a necessary and sufficient size with the illuminating light beam of high contrast, taking the characteristics of the LCD into consideration.

In the foregoing embodiments 1 and 2, the illuminating light beam or the light beam suitable for image display is converted by the diverging angle conversion means into a light beam having different diverging angles in the horizontal and vertical directions, and such light beam is used to form, at the exit pupil position, an exit pupil of which size is given by:

$$q_H = s_H = 2 \cdot \{13 \cdot \sin(W_H/2) + \cos(W_H/2)\}$$

$$q_V = s_V = 2 \cdot \{13 \cdot \sin(W_V/2) + \cos(W_V/2)\}$$

The actual values of $q_H$, $q_V$ may both be larger in terms of ease of observation, but the difference from the desirable value is preferably 20% or less in consideration of the effective utilization of the illuminating light.

Also the observation becomes difficult if the actual values become smaller than such desirable values, but the observation is still possible if the displaying light beam can reach an end of the pupil. The pupil diameters in such situation are given by:

$$q_H = 2 \cdot \{13 \cdot \sin(W_H/2)\}$$

$$q_V = 2 \cdot \{13 \cdot \sin(W_V/2)\}$$

and the actual pupil diameters are preferably larger than the values given above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image display apparatus comprising:
    a display for displaying an image on a display surface having a plurality of pixels;
    a light source for illuminating said display;
    a microlens array having a plurality of microlenses, each of which corresponds to one of said plurality of pixels of said display, said microlens array being disposed at a light source side or a side opposite to the light source with respect to said display, each of said plurality of microlenses having focal lengths differing in a vertical direction and a horizontal direction; and
    an optical system for guiding the image displayed on said display toward an eye of an observer, said optical system being common to all of said pixels of said display, with said optical system providing an exit pupil having different widths in vertical and horizontal directions formed substantially at a position where the pupil of the observer is present due to difference in focal lengths in the vertical and horizontal directions in each of said microlenses of said microlens array.

2. An apparatus according to claim 1, wherein the focal length of each of said plurality of microlenses in the vertical direction is longer than the focal length of each of said plurality of microlenses in the horizontal direction.

3. An apparatus according to claim 2, wherein a light beam emerging from each pixel of said display is adapted to pass through said corresponding microlens, and the light beams from all pixels of said display are guided through said optical system to a position where the pupil of the observer is positioned.

4. An apparatus according to claim 2, wherein a light beam from said light source is adapted to be converged by each microlens of said microlens array, and the light beam from each microlens is incident on the corresponding pixel of said display, and the light beams from all pixels of said display are guided through said optical system to a position where the pupil of the observer is positioned.

5. An apparatus according to claim 2, wherein each microlens has an anamorphic form.

6. An apparatus according to claim 2, wherein each microlens has a cylindrical form.

7. An apparatus according to claim 2, wherein two pairs of peripheral rays, respectively in the vertical and horizontal directions, of the light beam perpendicularly emitted from said light source, converged by said microlens and incident on each pixel of said display are converted into two pairs of peripheral rays having different divergent angles in the vertical direction and the horizontal direction by the action of said microlens to illuminate the image, and a distance $q_H$ between the pair of peripheral rays in the horizontal direction and a distance $q_V$ between the pair of peripheral rays in the vertical direction at the exit pupil of said optical system after passing through said optical system satisfy the following conditions:

$$2.4\{13\sin(W_H/2) + \cos(W_H/2)\} \geq q_H \geq 2\{13\sin(W_H/2)\}, \text{ and}$$
$$2.4\{13\sin(W_V/2) + \cos(W_V/2)\} \geq q_V \geq 2\{13\sin(W_V/2)\}$$

where $W_H$ represents a display field angle of a virtual image of the image in the horizontal direction and $W_V$ represents a display field angle of the virtual image of the image in the vertical direction.

8. An apparatus according to claim 2, wherein two pairs of peripheral rays, respectively in the vertical and horizontal directions, of the light beam emerging from each pixel of said display are converted into two pairs of peripheral rays having different divergent angles in the vertical direction and the horizontal direction by the action of said microlens, and a distance $q_H$ between the pair of peripheral rays in the horizontal direction and a distance $q_V$ between the pair of peripheral rays in the vertical direction at the exit pupil of said optical system after passing through said optical system satisfy the following conditions:

$$2.4\{13\sin(W_H/2) + \cos(W_H/2)\} \geq q_H \geq 2\{13\sin(W_H/2)\}, \text{ and}$$
$$2.4\{13\sin(W_V/2) + \cos(W_V/2)\} \geq q_V \geq 2\{13\sin(W_H/2)\}$$

where $W_H$ represents a display field angle of a virtual image of the image in the horizontal direction and $W_V$ represents a display field angle of the virtual image of the image in the vertical direction.

9. An apparatus according to claim 1, wherein said microlens array is disposed at the side opposite to the light source with respect to said display, and light from each pixel of said display is guided to said optical system through a corresponding microlens.

10. An image observing apparatus comprising:
    a display having a plurality of pixels;
    an optical system for guiding image information displayed on said display toward an eye of an observer; and
    an optical member for differentiating a diverging angle of a light beam outgoing from said display in a first direction from a diverging angle in a second direction substantially perpendicular to said first direction, wherein
    an exit pupil of said optical system has different widths in said first and second directions.

11. An image observing apparatus comprising:
    a display;
    a light source for illuminating said display;
    an optical system for guiding image information displayed on said display toward an eye of an observer; and
    an optical member for differentiating a diverging angle of a light beam outgoing from said display in a first direction from a diverging angle in a second direction substantially perpendicular to said first direction, said optical member being disposed on a side of said light source with respect to said display, wherein
    an exit pupil of said optical system has different widths in said first and second directions.

* * * * *

UNITED STATES PATENT AND TRADEMARK OFFICE
CERTIFICATE OF CORRECTION

PATENT NO. : 6,490,086 B2
DATED : December 3, 2002
INVENTOR(S) : Hideki Morishima It is certified that error appears in the above-identified patent and that said Letters Patent is hereby corrected as shown below:

Title page,
Item [56], References Cited, U.S. PATENT DOCUMENTS, "5,619,419 A   4/1997   Rallison" should read -- 5,619,377 A   4/1997   Rallison --.
Item [57], ABSTRACT,
Line 7, "obesever." should read -- observer --.

Column 2,
Line 3, "mark·indicates" should read -- mark • indicates --.
Lines 21 and 43, "a" should read -- $\alpha$ --.

Column 4,
Line 43, "q," should read -- $q_v$, --

Column 12,
Line 26, "$W_H/2)\}$" should read -- $W_v/2)\}$ --.

Signed and Sealed this

Eighth Day of July, 2003

JAMES E. ROGAN
*Director of the United States Patent and Trademark Office*